Patented Mar. 21, 1950

2,501,226

UNITED STATES PATENT OFFICE 2,501,226

THIO ETHERS OF ADIPONITRILE

Carl M. Langkammerer and Burt Carlton Pratt, Wilmington, Del., assignors to E. I. du Pont de Nemours & Company, Wilmington, Del., a corporation of Delaware No Drawing. Application March 11, 1949, Serial No. 81,028

7 Claims. (Cl. 260—465)

This invention relates to a new class of organic nitriles. More particularly, it relates to adiponitriles having thioether groups.

Adiponitrile is a highly important industrial chemical, since it is the starting material for the preparation of many compounds, including hexamethylenediamine, one of the principal components of nylon. Substituted adiponitriles are of considerable scientific and technical interest, per se or as precursors of a large number of compounds with diverse properties. Unfortunately, few substituted adiponitriles are available for study and, in particular, there is no report in the literature of any adiponitrile having thioether substituents, such as thioalkyl or thioaryl substituents.

It is an object of this invention to provide a new class of chemical compounds. A further object is to provide new nitriles having thioether groups. A still further object is to provide new adiponitriles having thioether substituents. Other objects will appear hereinafter.

These objects are accomplished by providing a new class of chemical compounds, the ethers of beta-thioadiponitrile. These new ethers of beta-thioadiponitrile are prepared by reacting, in the presence of catalytic amounts of an organic base having a dissociation constant of at least $1 \times 10^{-5}$ at 25° C., a mercaptan with a 1,4-dicyanobutene, that is 1,4-dicyano-2-butene or its isomer 1,4-dicyano-1-butene.

The starting material, 1,4-dicyano-2-butene, may be prepared, for example, by the method described in U. S. Patent No. 2,342,101. The isomeric 1,4-dicyano-1-butene may be conveniently prepared by isomerization of 1,4-dicyano-2-butene, for example by the method described in U. S. Patent No. 2,451,386. Either dicyanobutene can be used separately, or their mixtures in any proportions can be used.

The reactants are preferably used in equivalent proportions, that is one mole of dicyanobutene for each thiol group in the mercaptan, but an excess of one or the other does no harm. A solvent or diluent is not necessary but it is often desirable to use one, particularly when the resulting thioether is a solid. Any inert liquid which dissolves the reactants may be used, for example, aromatic hydrocarbons such as benzene or toluene, ethers such as di-n-butyl ether, heterocyclics such as tetrahydrofuran or thiophene and the like. It is noteworthy that alcohols such as methanol, ethanol, butanol and the like can be used in spite of the fact that, under other conditions, they add to the double bond of dicyanobutene to form beta-alkoxyadiponitriles. This reaction of alcohols, however, is not appreciably catalyzed by the agents which act as catalysts for the addition of thiols, and thus alcohols may be considered as inert solvents for the present reaction.

Any organic base which has a dissociation constant above $1 \times 10^{-5}$ may be used as the catalyst. Examples of such bases are methylamine, ethylamine, butylamine, dimethylamine, diethylamine, dipropylamine, trimethylamine, triethylamine, piperidine and the like. The base need be used only in catalytic amounts, e. g., between 0.001 and 0.1 mole of it per mole of dicyanobutene.

The reaction is often exothermic and may be carried out at low to moderate temperatures, such as between 0° and 25° C. In other cases, it is desirable to accelerate it by application of moderate heat, up to 100° to 150° C. The course of the reaction may be followed by titration of the remaining free thiol groups with an iodine solution. The reaction may be stopped at any desired time or it may be continued until all or substantially all of the thiol groups have disappeared.

The ethers of beta-thiadiponitrile are liquids or solids, the latter generally low melting, which may be isolated from the reaction mixture by any conventional method such as fractional distillation or crystallization.

Various ethers of beta-thioadiponitrile are illustrated in the following examples, in which parts are by weight.

Example I

To a solution of 106 parts of 1,4-dicyano-2-butene and 90.14 parts of butyl mercaptan in 150 parts of ethanol was added 1.5 parts of piperidine. The reaction mixture was allowed to stand at about 20° C. for 16 hours, then heated at 90-85° C. for 3 hours, at which time most of the thiol groups had disappeared, as determined by titration. The solvent was removed by distillation and the residue was distilled under reduced pressure. There was obtained 142.2 parts of beta-butylthioadiponitrile, boiling at 142° C. under 0.39 mm.

pressure, together with 23.1 parts of unreacted 1,4-dicyano-2-butene. The yield was 93% of the theoretical, based on the dicyanobutene consumed. Beta-butylthioadiponitrile is a colorless liquid with a refractive index $n_D^{25}$ 1.4885.

Anal.: Calculated for $C_{10}H_{16}N_2S$: C, 61.22; H, 8.16; N, 14.28; S, 16.32. Found: C, 61.83; H, 8.25; N, 1437; S, 15.99

Example II

A solution of 174 parts of n-decyl mercaptan and 106 parts of 1,4-dicyano-2-butene in 300 parts of ethanol was treated with 1 part of piperidine and heated to reflux for 1½ hours. After allowing the reaction mixture to stand at 20–25° C. for 16 hours, it was again heated to reflux and filtered hot. Upon cooling the filtrate at 0–5° C., a solid separated and was filtered off. This was beta-decylthioadiponitrile, a crystalline colorless solid melting at 36–40° C., which was obtained in an amount of 248.8 parts (89% yield).

Anal.: Calculated for $C_{16}H_{28}N_2S$: C, 68.57; H, 10.0; N, 10.0. Found: C, 68.57; H. 10.21; N, 10.06.

Example III

A solution of 101 parts of n-tetradecyl mercaptan and 53 parts of 1,4-dicyano-2-butene in 150 parts of ethanol was treated with 0.5 part of piperidine and refluxed for 3 hours. After allowing the reaction mixture to stand at room temperature for 48 hours, all of the thiol content had disappeared. The reaction mixture contained a solid which was filtered and recrystallized from 500 parts of absolute ethanol. There was thus obtained 127.3 parts (83% yield) of beta-tetradecylthioadiponitrile, M. P. 56–57° C.

Anal.: Calculated for $C_{20}H_{38}N_2S$: C, 71.42; H, 10.71; N, 8.33; S, 9.52. Found: C, 71.57; H, 10.79; N, 8.35; S, 9.14.

Example IV

A solution of 143 parts of n-octadecyl mercaptan and 53 parts of 1,4-dicyano-2-butene in 300 parts of ethanol was treated with 0.5 part of piperidine, refluxed for 1½ hours and allowed to stand at room temperature for 16 hours. The reaction mixture was then heated to boiling and filtered hot. On cooling the filtrate to 0–5° C., a solid crystallized and was filtered off. This was beta-octadecylthioadiponitrile, M. P. 65–68° C., which was obtained in an amount of 160.6 parts (82% yield).

Anal.: Calculated for $C_{24}H_{44}N_2S$: C, 73.47; H, 11.22. Found: C, 74.06; H, 11.71.

Example V

A solution of 10.6 parts of 1,4-dicyano-1-butene and 4.71 parts of ethanedithiol in 30 parts of ethanol was treated with 0.2 part of piperidine, whereupon a spontaneous exothermic reaction took place. After a short time the product separated into two layers and titration with an iodine solution indicated that nearly all of the thiol groups had reacted. The lower layer, which was the reaction product, was separated and a small amount of solvent was removed from it under diminished pressure. The residual oily material, which could not be induced to crystallize, was beta,beta'-(ethylenedithio)diadiponitrile, resulting from the condensation of two moles of 1,4-dicyano-1-butene with one mole of ethanedithiol.

Example VI

A solution of 21.2 parts of 1,4-dicyano-1-butene and 15.6 parts of mercaptoethanol in 30 parts of ethanol was treated with 0.2 part of piperidine. A spontaneous, exothermic reaction took place with disappearance of the thiol groups. The solvent was removed under reduced pressure, leaving as an uncrystallizable oil the resulting beta-(2-hydroxyethylthio)-adiponitrile.

Example VII

A solution of 21.2 parts of 1,4-dicyano-1-butene and 24.4 parts of 2(ethylthio)ethanethiol in 30 parts of ethanol was treated with 0.2 part of piperidine, whereupon an exothermic reaction took place. After allowing the reaction mixture to stand for 24 hours at room temperature the solvent was removed by evaporation under reduced pressure, leaving the liquid beta-[(2-ethylthio)ethylthio]adiponitrile.

Example VIII

A mixture of 44.6 parts of thiophenol, 42 parts of 1,4-dicyano-2-butene and 1.5 parts of piperidine was heated at 100° C. for 1½ hours, then allowed to stand at room temperature for 16 hours. At the end of this time, the thiol content of the mixture, as determined by titration, was nearly zero. The reaction product was washed with water and distilled. There was obtained 23.7 parts of beta-phenylthioadiponitrile, B. P. 167–175° C. at 0.2 mm. pressure, $n_D^{25}$ 1.5460.

Anal.: Calculated for $C_{12}H_{12}N_2S$: C, 66.66; H, 5.55. Found: C, 66.46; H, 5.76.

This invention includes as new products the ethers of beta-thioadiponitrile or, otherwise stated, the addition products of mercaptans with a 1,4-dicyanobutene, which addition products have the thioether portion of the mercaptan attached to the carbon beta to the nitrile group. The addition product of one mole of 1,4-dicyanobutene with one mole of a thiol can be represented by the general formula

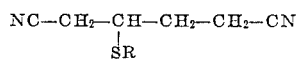

wherein R is the non-thiol portion of a mercaptan. Included within this class of new compounds are the aliphatic, cyclo-aliphatic, aromatic and heterocyclic ethers of beta-thioadiponitrile, and particularly hydrocarbon ethers of beta-thioadiponitrile such as the beta-alkylthioadiponitriles and the beta-arylthioadiponitriles.

The addition of a mercaptan to a 1,4-dicyanobutene proceeds readily regardless of the length of the radical attached to the thiol group or of the substituents, if any, attached to that radical and thus the method is general giving access to the broad new class of thioether-substituted adiponitriles. The reaction is represented by the equation:

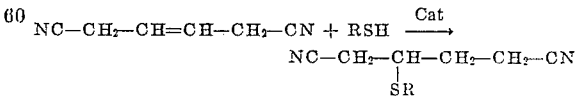

wherein R is the non-thiol portion of the mercaptan.

Other specific examples of this new class of ethers of beta-thioadiponitrile include beta-methylthioadiponitrile, beta-ethylthioadiponitrile, beta-allylthioadiponitrile, beta-butenylthioadiponitrile, beta-isoamylthioadiponitrile, beta-eicosylthioadiponitrile, beta-cyclohexylthioadiponitrile, beta-naphthylthioadiponitrile, beta-phenylethylthioadiponitrile, beta-mercaptothiazolinoadiponitrile, beta-(2-aminoethylthio)-adiponitrile, beta-(2-carbethoxyethylthio)- adiponitrile, beta,beta'-(hexamethylenedithio)-diadiponitrile.

The reaction is particularly clean-cut with monothiols, especially with monothiols which, apart from the thiol group are hydrocarbons. The preferred, because more accessible, hydrocarbon monothiols are those having from one to twenty carbon atoms. The preferred products are therefore those having the formula

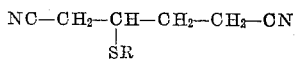

where R is a monovalent radical, particularly those in which R is a monovalent hydrocarbon radical, preferably an aliphatically saturated hydrocarbon radical, and still more preferably an aliphatically saturated hydrocarbon radical of one to twenty carbon atoms.

The ethers of beta-thioadiponitrile are useful per se, for example as plasticizers, insecticides and modifying agents for elastomers, particularly of the neoprene type. They are also useful as intermediates in the production of amines, acids, esters and amides by appropriate reactions of the nitrile groups and these compounds in turn are useful as polyamide intermediates, plasticizers, surface active agents etc.

As many apparently widely different embodiments of this invention may be made without departing from the spirit and scope thereof, it is to be understood that this invention is not limited to the specific embodiments thereof except as defined in the appended claims.

We claim:

1. A beta-alkylthioadiponitrile in which the alkyl group contains from 1 to 20 carbon atoms.

2. A beta-arylthioadiponitrile in which the aryl group contains not more than 10 carbon atoms.

3. A beta-thioether of adiponitrile having the formula

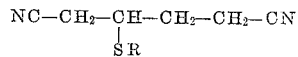

wherein R is a member selected from the group consisting of monovalent saturated aliphatic hydrocarbon radicals of from 1 to 20 carbon atoms and monovalent aryl radicals of not more than 10 carbon atoms.

4. A beta-thioether of adiponitrile having the formula

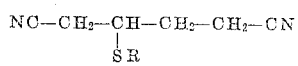

wherein R is a monovalent saturated aliphatic hydrocarbon radical of from 1 to 20 carbon atoms.

5. Beta-butlythioadiponitrile.
6. Beta-phenylthioadiponitrile.
7. Beta-tetradecylthioadiponitrile.

CARL M. LANGKAMMERER.
BURT CARLTON PRATT.

REFERENCES CITED

The following references are of record in the file of this patent:

UNITED STATES PATENTS

| Number | Name | Date |
|---|---|---|
| 2,413,917 | Harman | Jan. 7, 1947 |
| 2,448,755 | Zellner | Sept. 7, 1948 |
| 2,478,285 | Langkammerer | Aug. 9, 1949 |